(12) United States Patent
Lewis et al.

(10) Patent No.: US 8,509,804 B2
(45) Date of Patent: Aug. 13, 2013

(54) CALL ENHANCEMENT WITH LOCALIZED INFORMATION

(75) Inventors: John Lewis, Lawrenceville, GA (US); Justin McNamara, Atlanta, GA (US); Fulvio Arturo Cenciarelli, Suwanee, GA (US); Jeffrey Mikan, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 710 days.

(21) Appl. No.: 12/338,600

(22) Filed: Dec. 18, 2008

(65) Prior Publication Data

US 2010/0159942 A1    Jun. 24, 2010

(51) Int. Cl.
*H04W 24/00* (2009.01)

(52) U.S. Cl.
USPC .............. 455/456.1; 455/411; 455/456.6; 379/201

(58) Field of Classification Search
USPC ............. 455/411, 456.1, 456.6; 379/201
See application file for complete search history.

(56) References Cited

U.S. PATENT DOCUMENTS

| | | | |
|---|---|---|---|
| 2004/0266456 A1* | 12/2004 | Bostrom et al. | 455/456.2 |
| 2005/0250516 A1* | 11/2005 | Shim | 455/456.1 |
| 2010/0009657 A1* | 1/2010 | Dingler et al. | 455/411 |
| 2010/0029302 A1* | 2/2010 | Lee et al. | 455/456.6 |

OTHER PUBLICATIONS

Reardon, M., et al., 'Mobile phones that track your buddies', Article, (Nov. 14, 2006), 4 pages.

* cited by examiner

*Primary Examiner* — Amancio Gonzalez
(74) *Attorney, Agent, or Firm* — Woodcock Washburn LLP

(57) ABSTRACT

A phone call is enhanced by the addition of localized information. In an example embodiment, a call is placed between a first device and a second wireless device. The call enhancement system is employed to determine a specific geographic location of the second wireless device. The system then abstracts the specific geographic location of the second wireless device into a general geographic location of the second wireless device. The degree of abstraction employed is determined by reference to a configurable privacy setting. The system retrieves content associated with the general geographic location of the second wireless device and packages it for transmission to the first device. The content is transmitted to the first device for presentation on a display of the first device.

24 Claims, 8 Drawing Sheets

CALL ENHANCEMENT WITH LOCALIZED INFORMATION

BACKGROUND

Mobile wireless communications devices such as cellular telephones, BLACKBERRYS®, personal digital assistants, BLUETOOTH® headsets, and the like have become critical tools for professionals who need to remain connected while away from their offices. These mobile devices are capable of providing a variety of voice and data services which, in essence, create a mobile office by allowing a traveling professional to: answer and place calls remotely; receive and send emails and text messages; exchange files with coworkers or customers; and use applications normally associated with a desktop PC or laptop.

The value these devices provide, and a traveling professional's reliance on them, increases with the amount of contact that must be maintained while away from the office. An example of a profession that commonly requires time away from the office is that of a sales representative. Often a sales representative will be traveling or working in a remote office when the need arises to communicate with clients or customers in various locations. In some situations, it may be that both the sales representative and customer are traveling, and may not be aware of each other's locations.

An important aspect of a sales representative's work is being able to establish rapport with both current and prospective customers. A few minutes spent engaging in informal conversation can help put a customer in a more comfortable state of mind, before focusing on the business at hand. Common topics for informal conversation include the weather, items in the news, or the latest sports scores. Such topics often have significance to a customer if the information relates to their local area. Using informal conversation to build rapport can be especially helpful if a business meeting is being conducted over the phone and the sales representative and the prospective customer have never met face to face. In such a situation, it is beneficial to the sales representative to create a form of "telepresence" with the customer (i.e. allowing the customer to feel as if they are present at the meeting with the sales representative, rather than at their true location).

SUMMARY

The system disclosed herein leverages mobile wireless communication devices to provide data and services that can assist in the creation of an atmosphere similar to that created by more elaborate telepresence technologies. A user of a first device places a phone call to a user of a second device. The devices used for such communication may include wired and wireless devices such as laptops, personal digital assistants (PDAs), and smart phones. However, the scenario in which the disclosed system is most likely to be applied that of a wireless phone call placed between two cell phone users.

When the first user initiates the call to the second user, his mobile device sends information to his service provider's network regarding the second user he is trying to attempting to contact. The service provider uses this information to route the first user's call through the network to the second user's device. Data directing devices on the service provider's network can use signals sent from the second user's device to pinpoint his specific geographical location with varying degrees of accuracy. The disclosed system makes use of this location information in several ways.

First, the data directing devices can manipulate the specific geographical location of the second user's device through an abstraction process. During the abstraction process, the geographical location of the second user's device is generalized to varying degrees, based upon a configurable privacy setting. For example, the service provider's network may be aware of the specific longitudinal and latitudinal location of the second user's device, however, providing this level of detail of the second user's whereabouts to other parties may violate privacy concerns of the second user. For privacy reasons, the second user's geographical location may be abstracted from longitude and latitude to a generalized form, such as a city where the second user's device is located, or a zip code the second user's device is currently in.

Second, the system uses the general geographical location of the second user's device to provide the first user with content associated with the second user's location. Such pertinent information might include the local weather, local news events, or scores for local sports teams. The system gathers this content and transmits it to the first user's device for display on a screen of the first user's device. The content localized to the location of the second user's device can then be used by the user of the first device to create topics for informal conversation with the user of the second device. Content can be provided by the system during the call setup phase, or during the talk phase of the call.

The disclosed system also provides additional features regarding the collection and presentation of the localized content. One additional feature is the ability of the system to provide the service in a duplex manner, where users of both devices receive content associated with the location of the other. Another feature is the ability of the system to deliver dynamically updated content to users of the first system, for example score updates from a sporting event taking place during the call. Another feature of the system is providing profiles in which users can set or record preferences for how they interact with the system, for example the level of privacy provided, the types of content requested for display on a user's device, and whether the content should be displayed automatically or whether the user should be presented with the option to view the content. An additional feature of the system is the ability of a user to implement voice recognition monitoring that can monitor the course of the conversation and provide dynamic content updates based on keywords spoken during the course of the conversation.

DETAILED DESCRIPTION

Figure 1A:
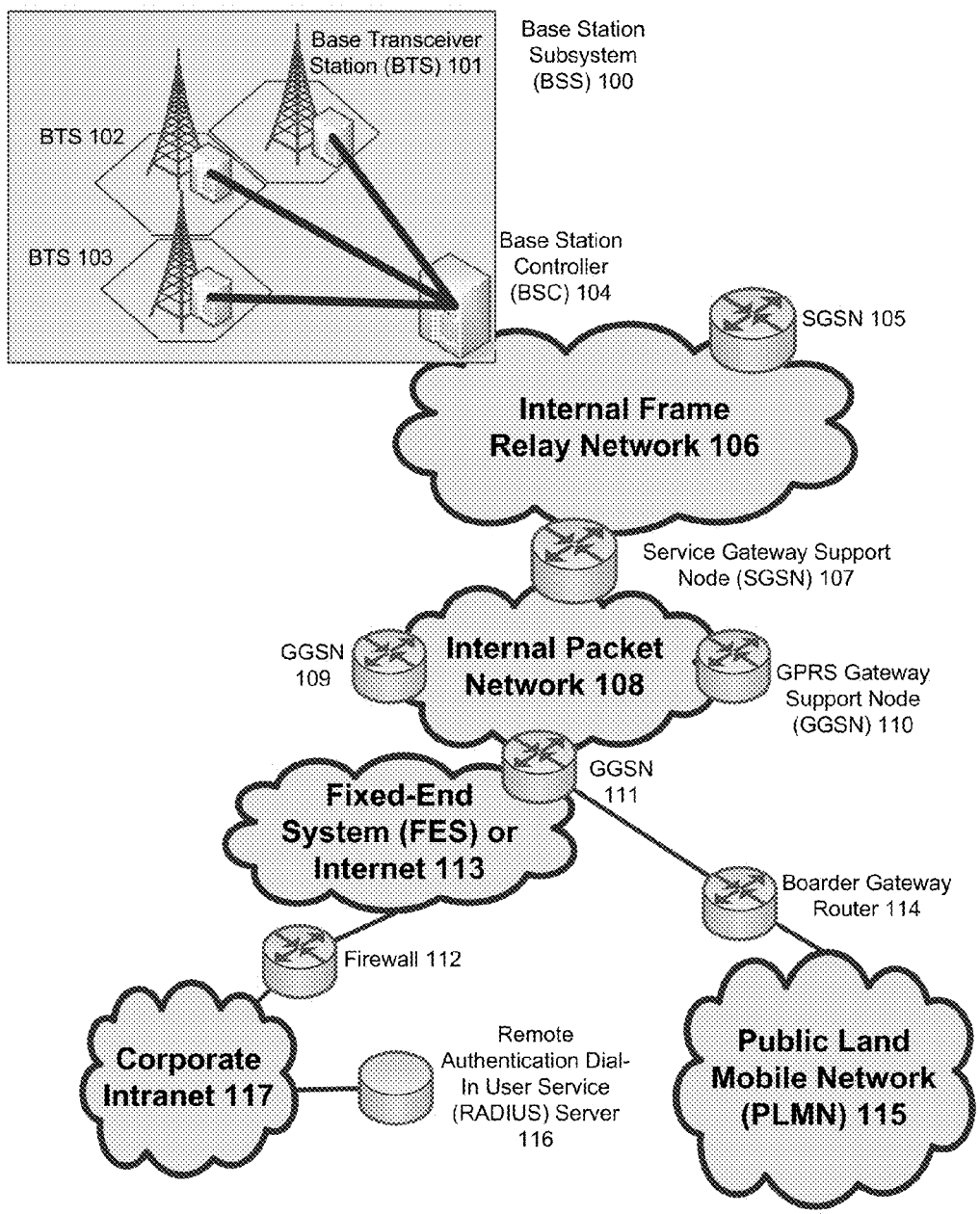
FIG. 1A depicts an overview of an example network environment in which aspects of an embodiment may be implemented.
Figure 1B:
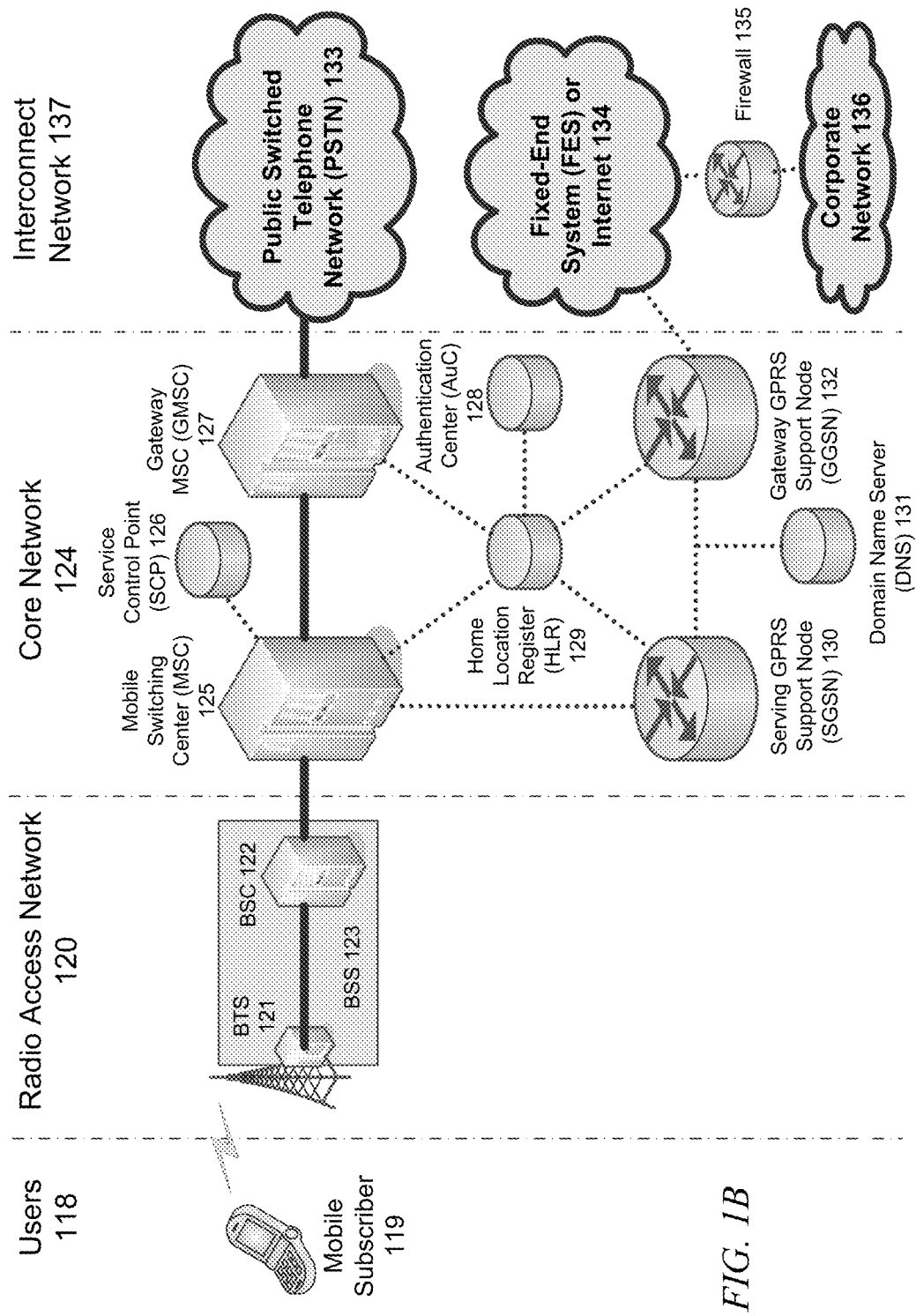
FIG. 1B depicts an example GPRS network architecture in which aspects of an embodiment may be implemented.
Figure 1C:
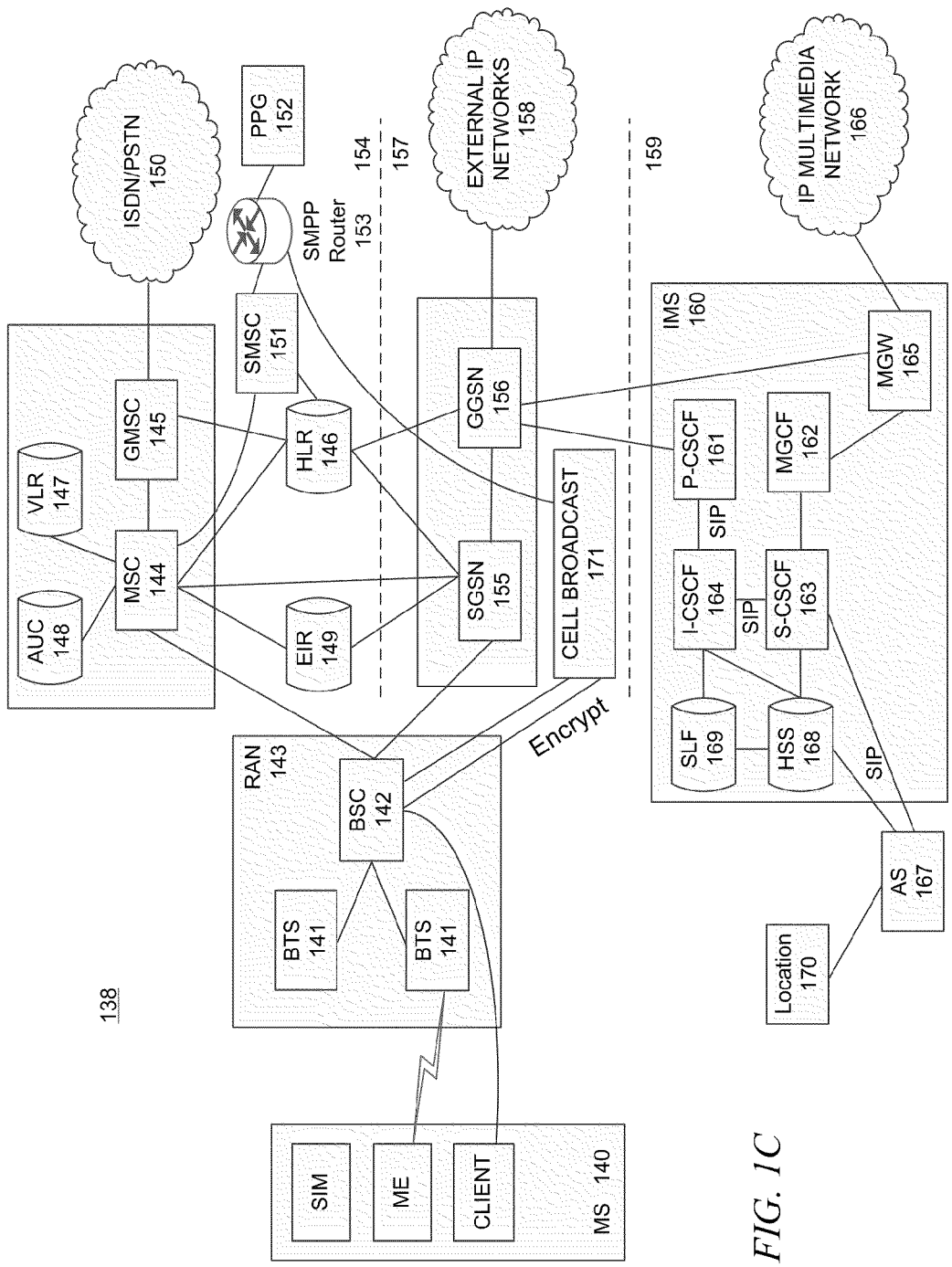
FIG. 1C depicts an alternate block diagram of an example GSM/GPRS/IP multimedia network architecture in which aspects of an embodiment may be implemented.

FIGS. 1A-C depict some example telephony radio networks and non-limiting operating environments in which a call enhancement with localized information system may be implemented. The below-described operating environments should be considered non-exhaustive, however, and thus the below-described network architecture merely shows an example network architecture in which aspects of various embodiments may be incorporated. One can appreciate, however, that aspects of an embodiment may be incorporated into now existing or future alternative architectures for communication networks.

The global system for mobile communication ("GSM") is one of the most widely-used wireless access systems in today's fast growing communication systems. GSM provides circuit-switched data services to subscribers, such as mobile telephone or computer users, for example. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications. For purposes of explanation, various embodiments are described herein in connection with GSM. The references to GSM are not exclusive, however, as it should be appreciated that embodiments may be implemented in connection with any type of wireless access system such as, for example, CDMA or the like.

As may be appreciated, the example GSM/GPRS environment and services described herein can also be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that shall become available in time. In this regard, the techniques of the various embodiments discussed below may be applied independently of the method of data transport, and does not depend on any particular network architecture, or underlying protocols.

FIG. 1A depicts an overall block diagram of an example packet-based mobile cellular network environment, such as a GPRS network, in which aspects of an embodiment may be practiced. In such an environment, there may be any number of subsystems that implement the functionality of the environment such as, for example, a plurality of Base Station Subsystems ("BSS") 100 (only one is shown in FIG. 1A), each of which comprises a Base Station Controller ("BSC") 104 serving a plurality of Base Transceiver Stations ("BTS") such as, for example, the BTSs 101, 102 and 103, which may be the access points where users of packet-based mobile devices become connected to the wireless network. In an embodiment, the packet traffic originating from user devices is transported over the air interface to the BTS 103, and from the BTS 103 to the BSC 104. Base station subsystems, such as the BSS 100, may be a part of internal frame relay network 106 that may include Service GPRS Support Nodes ("SGSN") such as the SGSN 105 and 107. Each SGSN 105, 107, etc. may be in turn connected to an internal packet network 108 through which the SGSN 105, 107, etc. can route data packets to and from a plurality of gateway GPRS support nodes (GGSN) 222, 111, 110, etc.

As illustrated, the SGSN 107 and the GGSNs 111 and 110 may be part of the internal packet network 108. Gateway GPRS serving nodes 111 and 110 may provide an interface to external Internet Protocol ("IP") networks such as Public Land Mobile Network ("PLMN") 115, corporate intranet 117, Fixed-End System ("FES"), the public Internet 113 and/or the like. As illustrated, corporate intranet 117 may be connected to the GGSN 111 via a firewall 112; and the PLMN 115 may be connected to the GGSN 111 via a boarder gateway router 114. A Remote Authentication Dial-In User Service ("RADIUS") server 116 may be used for caller authentication when a user of a mobile cellular device calls a corporate intranet 117, for example.

Generally, there may be four cell sizes in a GSM network—macro, micro, pico and umbrella cells. The coverage area of each cell is different in different environments. Macro cells may be regarded as cells where the base station antenna is installed in a mast or a building above average roof top level. Micro cells may be cells whose antenna height is under average roof top level; they are typically used in urban areas. Pico cells may be small cells having a diameter is a few dozen meters; they may be mainly used indoors. On the other hand, umbrella cells may be used to cover shadowed regions of smaller cells and fill in gaps in coverage between those cells.

FIG. 1B illustrates the architecture of a typical GPRS network as segmented into four areas: users 118, radio access network 120, core network 124 and interconnect network 137. The users area 118 may include a plurality of end users. The radio access network 120 may include a plurality of base station subsystems such as BSSs 123, which include BTSs 121 and BSCs 122. The core network 124 may include a host of various network elements. As illustrated here, the core network 124 may include a Mobile Switching Center ("MSC") 125, a Service Control Point ("SCP") 126, a gateway MSC 127, a SGSN 130, a Home Location Register ("HLR") 129, an Authentication Center ("AuC") 128, a Domain Name Server ("DNS") 131 and a GGSN 132. The interconnect network 137 also may include networks and network elements. As illustrated in FIG. 1B, the interconnect network 137 may include a Public Switched Telephone Network ("PSTN") 133, a Fixed-End System ("FES") and/or the Internet 134, a firewall 135 and/or a Corporate Network 136.

An MSC 125 may be connected to a large number of base station controllers. At MSC 125, for example, depending on the type of traffic, the traffic may be separated such that voice may be sent to Public Switched Telephone Network ("PSTN") 133 through Gateway MSC ("GMSC") 127, and/or data may be sent to the SGSN 130, which then sends the data traffic to the GGSN 132 for further forwarding.

When the MSC 125 receives call traffic, for example, from the BSC 122, it may send a query to a database hosted by the SCP 126. The SCP 126 may process the request and may issue a response to the MSC 125 so that it may continue call processing as appropriate.

The HLR 129 may be a centralized database for users to register with the GPRS network. The HLR 129 may store static information about the subscribers such as the International Mobile Subscriber Identity ("IMSI"), subscribed services, and/or a key for authenticating the subscriber. The HLR 129 may also store dynamic subscriber information such as the current location of the mobile subscriber. Associated with HLR 129 may be an AuC 128. The AuC 128 may be a database that contains the algorithms for authenticating subscribers and may include the associated keys for encryption to safeguard the user input for authentication.

In the following, depending on context, the term "mobile subscriber" may refer to either the end user or to the actual portable device used by an end user of the mobile cellular service. When a mobile subscriber turns on a mobile device, the mobile device goes through an attach process by which the mobile device attaches to a SGSN of the GPRS network. Referring now to FIG. 1B, mobile subscriber 119 may initiate the attach process by turning on the network capabilities of the mobile device. An attach request may be sent by the mobile subscriber 119 to the SGSN 130. The SGSN 130 may query another SGSN, to which the mobile subscriber 119 may have been attached before, for the identity of the mobile subscriber 119. Upon receiving the identity of the mobile subscriber 119 from the other SGSN, the SGSN 130 may request more information from the mobile subscriber 119. This information may be used to authenticate the mobile subscriber 119 to the SGSN 130 by the HLR 129. Once the mobile subscriber 119 is verified, the SGSN 130 may send a location update to the HLR 129 indicating the change of location to a new SGSN, in this case the SGSN at 130. The HLR 129 may notify the old SGSN, to which the mobile subscriber 119 was attached, to cancel the location process for the mobile subscriber 119. The HLR 129 may then notify the SGSN 130 that the location update has been performed. At this time, the SGSN 130 may send an "Attach Accept" message to the mobile subscriber 119, which in turn, may send an "Attach Complete" message to the SGSN 130.

After the attaching process, the mobile subscriber 119 may enter an authentication process. In the authentication process, the SGSN 130 may send authentication information to the HLR 129, which may send information back to the SGSN 130 based on the user profile that was part of the user's initial setup. The SGSN 130 may then send a request for authentication and ciphering to the mobile subscriber 119. The mobile subscriber 119 may use an algorithm to send the user identification (ID) and/or a password to the SGSN 130. The SGSN 130 may use the same algorithm to compare the result. If a match occurs, the SGSN 130 may authenticate the mobile subscriber 119.

Next, the mobile subscriber 119 may establish a user session with the destination network, for example, the corporate network 136, by going through a Packet Data Protocol ("PDP") activation process. The mobile subscriber 119 may request access to the Access Point Name ("APN"), for example, UPS.com, and the SGSN 130 may receive the activation request from the mobile subscriber 119. The SGSN 130 may then initiate a Domain Name Service ("DNS") query to learn which GGSN node has access to the UPS.com APN. The DNS query may be sent to the DNS server 131 within the core network 124 which may be provisioned to map to one or more GGSN nodes in the core network 124. Based on the APN, the mapped GGSN 132 may access the requested corporate network 136. The SGSN 130 may then send to the GGSN 132 a Create Packet Data Protocol ("PDP") Context Request message. The GGSN 132 may send a Create PDP Context Response message to the SGSN 130, which may then send an Activate PDP Context Accept message to the mobile subscriber 119.

Once activated, data packets of the call made by the mobile subscriber 119 may then go through radio access network 120, core network 124, and interconnect network 137, to reach corporate network 136.

FIG. 1C shows an example block diagram view of a GSM/GPRS/IP multimedia network architecture 138. As illustrated, the architecture 138 of FIG. 1C includes a GSM core network 154, a GPRS network 157 and/or an IP multimedia network 159. The GSM core network 154 may include a Mobile Station (MS) 140, at least one Base Transceiver Station (BTS) 141, and/or a Base Station Controller (BSC) 142.

The MS 140 may be Mobile Equipment (ME), such as a mobile phone and/or a laptop computer that is used by mobile subscribers, with a Subscriber identity Module (SIM). The SIM may include an International Mobile Subscriber Identity (IMSI), which may include a unique identifier of a subscriber. The BTS 141 may be physical equipment, such as a radio tower, that enables a radio interface to communicate with the MS 140. Each BTS may serve more than one MS 140. The BSC 142 may manage radio resources, including the BTS 141. The BSC 142 may be connected to several BTSs 141. The BSC 142 and BTS 141 components, in combination, are generally referred to as a base station (BS) and/or a radio access network (RAN) 143.

The GSM core network 154 may include a Mobile Switching Center (MSC) 144, a Gateway Mobile Switching Center (GMSC) 145, a Home Location Register (HLR) 146, a Visitor Location Register (VLR) 147, an Authentication Center (AuC) 148, and an Equipment Identity Register (EIR) 149. The MSC 144 may perform a switching function for the network. The MSC may perform other functions, such as registration, authentication, location updating, handovers, and call routing. The GMSC 145 may provide a gateway between the GSM network and other networks, such as an Integrated Services Digital Network (ISDN) or a Public Switched Telephone Network (PSTN) 150. In other words, the GMSC 145 may provide interworking functionality with external networks.

The HLR 146 may include a database that contains administrative information regarding each subscriber registered in a corresponding GSM network. The HLR 146 may contain the current location of each mobile subscriber. The VLR 147 may include a database that contains selected administrative information from the HLR 146. The VLR may contain information necessary for call control and provision of subscribed services for each mobile subscriber currently located in a geographical area controlled by the VLR 147. The HLR 146 and the VLR 147, together with MSC 144, may provide call routing and roaming capabilities of the GSM network. The AuC 148 may provide parameters for authentication and/or encryption functions. Such parameters may allow verification of a subscriber's identity. The EIR 149 may store security-sensitive information about the mobile equipment.

The Short Message Service Center (SMSC) 151 may allow one-to-one Short Message Service (SMS) messages to be sent to/from the MS 140. For example, the Push Proxy Gateway (PPG) 152 may be used to "push" (i.e., send without a synchronous request) content to mobile subscriber 119. The PPG 152 may act as a proxy between wired and wireless networks to facilitate pushing of data to MS 140. Short Message Peer to Peer (SMPP) protocol router 153 may be provided to convert SMS-based SMPP messages to cell broadcast messages. SMPP may include a protocol for exchanging SMS messages between SMS peer entities such as short message service centers. It may allow third parties, e.g., content suppliers such as news organizations, to submit bulk messages.

To gain access to GSM services, such as speech, data, and short message service (SMS), the MS 140 may first register with the network to indicate its current location by performing a location update and IMSI attach procedure. MS 140 may send a location update including its current location information to the MSC/VLR, via the BTS 141 and the BSC 142. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 157 may be logically implemented on the GSM core network architecture by introducing two packet-switching network nodes, a serving GPRS support node (SGSN) 155 and a Gateway GPRS support node (GGSN) 156. The SGSN 155 may be at the same hierarchical level as the MSC 144 in the GSM network. The SGSN may control the connection between the GPRS network and the MS 140. The SGSN may also keep track of individual MS locations, security functions, and access controls.

The Cell Broadcast Center (CBC) 171 may communicate cell broadcast messages that are typically delivered to multiple users in a specified area. A Cell Broadcast may include a one-to-many geographically focused service. It may enable messages to be communicated to multiple mobile phone customers who are located within a given part of its network coverage area at the time the message is broadcast.

The GGSN 156 may provide a gateway between the GPRS network and a public packet network (PDN) or other IP networks 158. That is, the GGSN may provide interworking functionality with external networks, and may set up a logical link to the MS through the SGSN. When packet-switched data leaves the GPRS network, it is transferred to external TCP-IP network 158, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time. The class B MS may attach to the network for both GPRS services and GSM services simultaneously. However, the class B MS may not support simultaneous operation of the GPRS services and GSM services. That is, the class B MS may use one of the two services at a given time. A class C MS may attach to one of the GPRS services and GSM services at a time. A class C MS can attach for only one of the GPRS services and GSM services at a time. Simultaneous attachment and operation of GPRS services and GSM services is not possible with a class C MS.

The GPRS network 157 may be designed to operate in three network operation modes (NOM1, NOM2 and NOM3). A network operation mode of a GPRS network may be indicated by a parameter in system information messages transmitted within a cell. The system information messages may dictate to a MS where to listen for paging messages and how signal towards the network. The network operation mode may represent the capabilities of the GPRS network. In a NOM1 network, a MS may receive pages from a circuit switched domain (voice call) when engaged in a data call. The MS may suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS may monitor pages for a circuit switched network while receiving data and vise versa.

IP multimedia network 159 was introduced with 3GPP Release 5, and includes IP multimedia subsystem (IMS) 160 to provide rich multimedia services to end users. A representative set of the network entities within IMS 160 are a call/session control function (CSCF), media gateway control function (MGCF) 162, media gateway (MGW) 165, and a master subscriber database, referred to as a home subscriber server (HSS) 168. HSS 168 may be common to GSM core network 154, GPRS network 157 as well as IP multimedia network 159.

IP multimedia system 160 is built around the call/session control function, of which there are three types: interrogating CSCF (I-CSCF) 164, proxy CSCF (P-CSCF) 161 and serving CSCF (S-CSCF) 163. P-CSCF 161 may be the MS's first point of contact with IMS 160. P-CSCF 161 forwards session initiation protocol (SIP) messages received from the MS to an SIP server in a home network (and vice versa) of the MS. P-CSCF 161 may also modify an outgoing request according to a set of rules defined by the network operator (for example, address analysis and potential modification).

The I-CSCF 164 may be an entrance to a home network, may hide the inner topology of the home network from other networks, and may provide flexibility for selecting an S-CSCF. The I-CSCF 164 may contact subscriber location function (SLF) 169 to determine which HSS 168 to use for the particular subscriber, if multiple HSSs 168 are present. The S-CSCF 163 may perform the session control services for the MS 140. This includes routing originating sessions to external networks and routing terminating sessions to visited networks. S-CSCF 163 may also decide whether application server (AS) 167 is required to receive information on an incoming SIP session request to ensure appropriate service handling. This decision may be based on information received from HSS 168 (or other sources, such as application server 167). The AS 167 also communicates to location server 170 (e.g., a Gateway Mobile Location Center (GMLC)) that provides a position (e.g., latitude/longitude coordinates) of the MS 140.

The HSS 168 may contain a subscriber profile and may keep track of which core network node is currently handling the subscriber. It may also support subscriber authentication and authorization functions (AAA). In networks with more than one HSS 168, a subscriber location function provides information on HSS 168 that contains the profile of a given subscriber.

The MGCF 162 may provide interworking functionality between SIP session control signaling from IMS 160 and ISUP/BICC call control signaling from the external GSTN networks (not shown). It also may control the media gateway (MGW) 165 that provides user-plane interworking functionality (e.g., converting between AMR- and PCM-coded voice). The MGW 165 may communicate with other IP multimedia networks 166.

The Push to Talk over Cellular (PoC) capable mobile phones may register with the wireless network when the phones are in a predefined area (e.g., job site, etc.). When the mobile phones leave the area, they may register with the network in their new location as being outside the predefined area. This registration, however, may not indicate the actual physical location of the mobile phones outside the pre-defined area.

Figure 2:
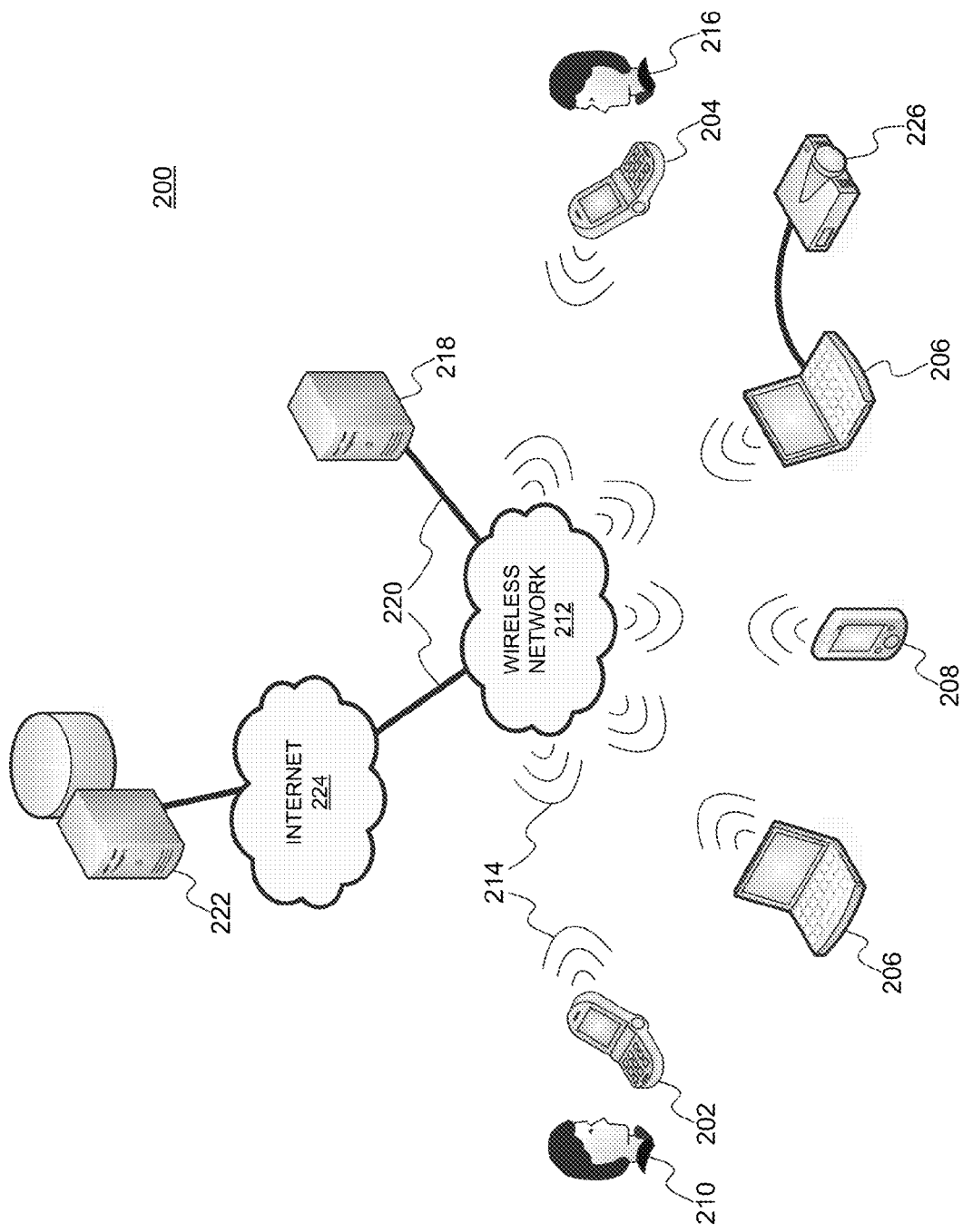
FIG. 2 depicts an example system for providing call enhancements with localized information.

FIG. 2 depicts an example system 200 for implementing call enhancement with localized information. The wireless communications devices that use the system may be any electronic device suitable for providing wireless communications. For example, the wireless communications devices may include first 202 and second 204 cellular telephones ("cell phones"), a wireless enabled laptop computer 206 ("laptop"), a personal digital assistant ("PDA") 208, and the like. Throughout the remainder of this specification, the various embodiments of the system will be described with reference to one or more cell phones. Use of the term cell phone in example embodiments should be construed to include other applicable wireless communications devices, for example those mentioned above.

A call between two wireless communications devices using the system may be a traditional wireless phone call between two wireless cell phones. A call may also be another form of wireless communication, for example an electronic mail message, an instant message, a text message, a picture message, a video message, a page, and the like.

A first user 210 may operate a cell phone 202 which may be connected to a wireless network 212 via a wireless communications channel 214. The wireless network 212 may encompass one or more of a radio access network 120, a core network 124, or an interconnect network 137 (as shown in FIG. 1A). The wireless communications channel 214 may be a point-to-point wireless communications channel. For example, the wireless communications channel 214 may include RF communications, and may be in accordance with the BLUETOOTH® protocol. The wireless communications channel 214 may be established via a wireless network 212.

The first user 210 may place a call to a second user's cell phone 204. When first user 210 initiates the call, his cell phone 202 may transmit call setup information to the wireless network 212. The call setup information may be routed through wireless network 212, and may pass through one or more network data directing devices ("DDD") 218. The DDD 218 may be one or more of the switching devices in radio access network 120, core network 124, or interconnect network 137, for example a BTS, a BCS, a BSC, an MSC, an SCP, a GMSC, an SGSN, a GGSN, a switching or routing component of the PSTN, and the like.

The call enhancement with localized information system 200 may receive an indication of a call at any time during a wireless communication session between two or more devices. In an embodiment, the system may be automatically invoked during the initiation or call setup phase of a wireless cell phone call. A first user 210 may use his cell phone 202 to place a call to a cell phone 204 of a second user 216. When the first user presses the send key or otherwise indicates his desire to place the call, his cell phone may transmit information to the wireless network 212 indicating the initiation of the call. The information transmitted may contain call setup information, for example the phone number assigned to the first user's cell phone, the phone number assigned to the device of the second user, and the like. The system, after detecting the initiation of the call, may transmit content to the first user's cell phone for presentation. The content may be seen by the first user on a display screen of his cell phone 202 while call setup is completed. When the second user answers the first user's call, which may complete the call setup process, the content may continue to be displayed on the first user's cell phone. In another embodiment, the content might be removed from the display screen of the first user's cell phone after call setup is completed.

In another embodiment, a prompt may be presented on the first user's cell phone 202, allowing the first user 210 to choose whether or not the system 200 will be invoked. The prompt may be presented after the system has detected initiation of the call. The prompt might also be displayed after call setup is completed and the users are communicating. Whether and when the user is prompted to invoke the system 200 may be determined by a setting in a profile associated with the first user's cell phone 202. In another embodiment, call setup may be completed and the first user 210 may enter a request to invoke the system 200 at a point of his choosing during the course of the call.

In an embodiment, the DDD 218 may be connected to the wireless network 212 via a wire line communications channel 220 over a hard wired communications link. The wire line communications channel 220 may be established over a variety of physical carrier mediums, for example twisted-pair copper cable, fiber optic cable, and the like. In another embodiment, the DDD 218 may be connected to wireless network 212 via a wireless communication channel (not shown).

The DDD 218 may communicate with other devices in wireless network 212 to determine a specific geographic location of the second user's cell phone 204. The specific geographic location of a cell phone may include an estimation of the actual physical location of the cell phone. The specific geographic location of a cell phone may include the most accurate determination possible of the actual physical location of the cell phone. Determining the specific geographic location may be performed using various methods.

A second user's cell phone 204 can be geographically located using its roaming signal. A cell phone may consistently emit a roaming signal by which it contacts nearby antenna tower base stations, for example BTS 121. One or more location-based services can then be used to approximate the location of the cell phone based on the signal strength of the roaming signal to nearby base station antenna masts. Examples of commonly employed location-based services include Enhanced Cell Identification (E-CID), Time Difference of Arrival (TDOA), Time of arrival (TOA), Angle of Arrival (AOA), Enhanced Observed Time Difference (E-OTD), Assisted-GPS (A-GPS), and the like. Some of these techniques compare the relative signal strength from multiple antenna towers to determine the location of a cell phone. Others use an antenna pattern that supports angular determination and phase discrimination. These techniques may determine a cell phone's location within a precision of 150 feet in urban areas where wireless communications traffic and density of antenna towers (base stations) is sufficiently high. In rural and desolate areas there may be many miles between base stations, which may make the determination of a cell phone's location less precise. The second user's cell phone 204 may be global positioning system (GPS) able, and a base station receiving a signal can query the cell phone for its longitude and latitude, enabling the determination of the cell phone's location to within 16 feet.

The call enhancement with localized information system 200, including the various features and embodiments described throughout this specification, could also be applied to a call between a first device and a second device where one or both devices may not be wireless devices. For example, one or both devices may be a land line telephone (not shown) connected to a PSTN. In an embodiment, the specific geographic location of a called party's land line telephone (not shown) may be determined by reference to the NPA/NXX assigned to the telephone in the local telephone central office equipment. The NPA (Numbering Plan Area code) and NXX (Central Office or Exchange code) may be used to determine the geographic area code the called party's telephone resides in, along with the local central office location, or exchange, which provides telephone services to the telephone. The NPA/NXX codes together may define a specific geographical location for purposes of the call enhancement with localized information system 200.

Once the specific geographic location of the second user's cell phone 204 has been determined, the location information may be transmitted over the network to a DDD 218, where the specific geographic location may be abstracted by the DDD 218 into a general geographic location. A general geographic location identifies the location of a user's cell phone with a lesser degree of accuracy than a specific geographic location. The process of abstraction may be performed in order to preserve the privacy of second user 216. Abstraction of the specific geographic location of a user's cell phone may be carried out to varying degrees. The degree of abstraction may be determined by reference to a configurable privacy setting stored in a profile associated with a user's cell phone. A user may not desire that the geographic location of his phone be known to within a matter of feet. For example the second user 216 might configure the privacy setting to limit disclosure of his cell phone's geographic location to the zip code where his phone is located, or alternatively the city, county, or state where his phone is located. Second user 216 might also desire to block access to the geographic location of his cell phone altogether.

In an embodiment, the second user 216 may select geographic location privacy levels based on a characteristic of a first user's cell phone 202, for example the first user's phone number. In such a way, the second user 216 may determine a privacy level for each potential caller in the user's contact list stored on the user's cell phone. In an alternative embodiment, the second user 216 may assign a particular privacy level to the entire contact list. In another embodiment, the second user 216 may create several lists of contacts, with each list having a geographic location privacy level assigned. In another alternative embodiment, the second user 216 may assign a geographic location privacy level for a first user 210 before or at the time a call is placed. In another embodiment, a default geographic location privacy level may be set on a second user's cell phone 204 so that any first user 210 who does not have a specific geographic location privacy level associated with the user will be assigned to the default geographic location privacy level. Any combination of these geographic location privacy levels, or means of assigning a geographic location privacy level to a first user 210, or any other geographic location privacy levels or means or methods of assigning geographic location privacy levels, are contemplated as within the scope of the present disclosure.

Once the specific geographic location of the second user's cell phone 204 has been abstracted into a general geographic location of the device, the DDD 218 may then use that location information to gather information or media associated with the general geographic location ("content") for transmission to the first user's cell phone 202. In an embodiment, the content may be pertinent to the general geographic location and may include a wide variety of information which may be considered relevant by, among others, residents of or visitors to the general geographic location. Such information may include information on local weather conditions, sports scores for collegiate or professional sports teams native to the general geographic location, or important news items that occurred in the general geographic location or have an impact upon it. Further, it may be desired that the content be timely, such that the events of its subject matter have occurred recently enough that the significance and newsworthiness of the information will not have diminished to the point where it loses relevance. The preceding categories are merely examples, and any combination of these or other categories which may be associated with the general geographic location are contemplated as within the scope of the present disclosure. The content may be embodied in varying media formats, for example text, pictures, audio, video, embedded hyper links, and the like.

Content may be gathered from one or more of the preceding categories, or additional categories not enumerated, and grouped together into a content package ("package") for transmission to the first user's cell phone 202. Various sources may determine the categories of content which may be included in the package. The categories of content that make up the package may be determined by reference to a profile. The profile may store user preferences for indicating which categories of content the first user 210 is interested in having displayed on his cell phone. A user profile may also store preferences or settings for other features of the disclosed system.

The profile may be stored locally on the first user's cell phone 202, or may be stored at a remote location on the network, for example on the DDD 218. The profile may have default category selections of content, which may be customized and updated by the user. In an embodiment, the profile may contain global preferences that apply each time the first user 210 places a call, thus retrieving content for the same categories in each instance. In another embodiment, the profile may be customizable on a contact basis. For example, the first user 210 might set different categories for various contacts in the address book on his cell phone 202. In another embodiment, the profile may contain varying categories that are called upon based on the time of day, day of the week, month of the year, or a specific date on which the call is being placed.

Content may be selected based on the context of the call. Once the context of the call is determined, relevant categories of content may be selected. In an embodiment, a third party might be observing the call, and may select content categories related to the current subject matter of the call. For example, if the first user 210 and the second user 216 are engaged in a conversation and the second user 216 mentions the weather, the third party observer may retrieve content related to the weather conditions at the second user's general geographic location for display on the first user's cell phone 202. In another embodiment speech recognition technologies may be used to determine the context of the call. For example, speech recognition software may be employed to monitor the conversation during the course of a call. A set of keywords may be provided to the speech recognition software, which if spoken by one of the participants of the call, will trigger the creation of a query to retrieve content associated with that keyword. For example, if the first user 210 and the second user 216 are engaged in a conversation and the second user mentions the keyword 'weather,' the speech recognition software would trigger the system to retrieve content related to the weather conditions at the second user's general geographic location for display on the first user's cell phone 202.

In an embodiment the speech recognition software may reside and run on the DDD 218. In another embodiment, the system 200 may leverage speech recognition software installed on the first user's cell phone 202. Whether or not speech recognition based content selection will be employed may be based upon a setting stored in the aforementioned profile for the user placing the call. Speech recognition based content selection might be available upon a request of the first user 210 made upon initiation of the call, and/or after call setup at a desired point during the course of the call.

The content gathered by the DDD 218 may be stored in various locations. In an embodiment, the content may be stored locally in the memory or storage area of the DDD 218. In another embodiment, the DDD 218 might send a query to another device (not shown) residing on the wireless network 212, requesting the information that it requires. In yet another embodiment, the DDD 218 might send a query to another device not resident on wireless network 212, for example a server device 222, which resides on a network remote from, but connected to wireless network 212, such as the Internet 224. The server device 222 may be any one of a number of devices which are capable of communicating information to a network, for example a web content server computer, a network connected storage drive, a personal computer, a gateway, a router, a modem, and the like. In an embodiment, the query from the DDD 218 may be forwarded across wireless network 212 and onto the Internet 224, perhaps traversing several other gateway and data directing devices, before arriving at server device 222. The server device 222 may then send a response message, containing the requested content, back across the networks to the DDD 218. In another embodiment, the content may be assembled from content stored locally on the DDD 218 and content stored on other devices, such as a server device 222.

Once the initial package of content has been assembled, it may be transmitted to the first user's cell phone 202 via wireless network 212. In an embodiment the transmission that contains the content may be sent from the DDD 218. In another embodiment, the DDD 218 may request that a remote content holder directly fulfill the request for the content, for example server device 222, bypassing the DDD 218 during transmission of the content. In another embodiment, a portion of the content package may be transmitted from the DDD 218, while another portion of the content may be transmitted from another device, such as server device 222. In such a case, the separate portions of content may be assembled into the final content package on the first user's cell phone 202 prior to display.

Subsequent to the initial content package transmission has been received at the first user's cell phone 202, and displayed for the first user, it may be possible for the system to transmit additional content packages containing dynamically updated content. For example, an initial transmission to the first user's cell phone 202 may contain the score for a professional sports game in progress. At a later time during the course of the call, one or more additional content packages may be transmitted to the first user's cell phone 202, containing score updates, or a final score accompanied by statistics for the game. Whether or not the system queries for and transmits dynamically updated content may be determined based on a setting in the aforementioned user profile.

In addition to presenting the content on a display of the first user's cell phone 202, it may also be possible for the system to forward the content to one or more additional wireless devices. For example, the first user 210 may desire to have the content forwarded from his cell phone 202 to his laptop 206, which may also be connected to wireless network 212 via a wireless communications channel 214. The content could then be viewed on the larger display of the laptop, or projected onto an even larger screen via a projector 226 attached to laptop 206 (e.g. allowing other participants on a conference call to view the content). In an embodiment, the forwarded content may be displayed on both the first user's cell phone 202 and on his laptop 206. In another embodiment, the content may be displayed on the device it was forwarded to, for example laptop 206. In another embodiment, the content may be forwarded to PDA 208, or other wireless devices.

In additional claimed embodiments, the system may operate in a duplex mode, enabling a two-way exchange of content between the first user 210 and the second user 216. When operating in duplex mode, all of the features and configurations described above may function to enable the second user's cell phone 204 to receive content associated with the general geographic location of the first user's cell phone 202. These additional embodiments enable both the user placing the call and the user receiving the call to be presented with content associated with the other party's location.

Figure 3:
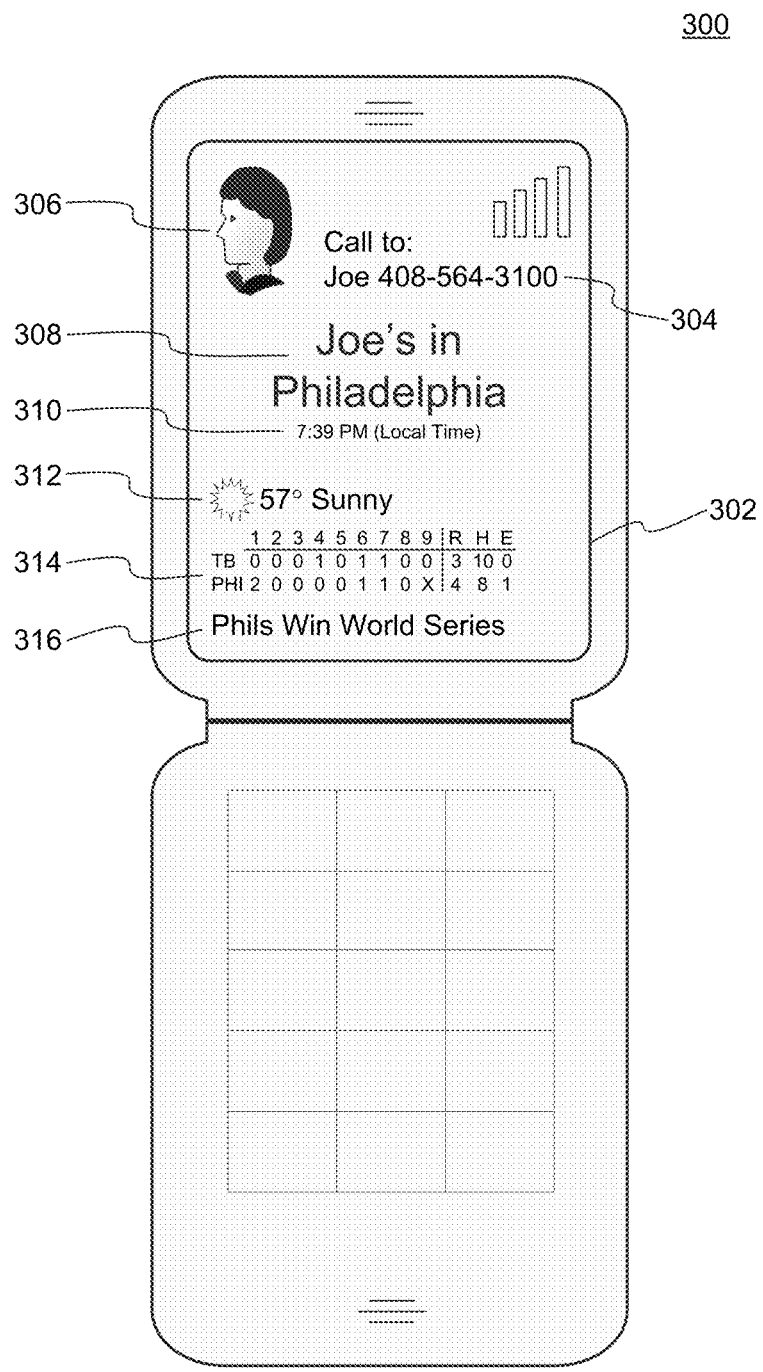
FIG. 3 depicts an example of content associated with a general geographic location displayed on a wireless communications device.

FIG. 3 depicts an example cell phone 300 displaying content that was transmitted to the device according to an embodiment of the system. The display screen 302 on cell phone 300 presents several features and elements of the system when a user places a call. Information about the called party 304 may be displayed. Called party information 304 may include the name and phone number of the recipient of the user's call. A picture of the called party 306 may also be displayed. The system may also display information on the general geographic location 308 of the called party. The level of specificity of the general geographic location 308 information presented may be in accord with the aforementioned privacy level determined during abstraction of the specific geographic location of the called party's device. The local time 310 at the general geographic location may also be displayed for the user.

The system may also display content headlines 312, 314, and 316 related to one or more items from various categories of content associated with the general geographic location of the called party. Content headlines 312, 314, and 316 may be presented in a format similar to those seen on television news programs or listed on news websites. In another embodiment, the content may be in the aforementioned headline format, but the individual headlines may include embedded links to supplemental content stored elsewhere. If the user selects one of the content headlines containing an embedded link, the user's device may obtain supplemental content for presentation on the device's display screen 302. The supplemental content may include additional information stored on the DDD 218 or may include content stored elsewhere, for example on a server device 222, and downloaded to cell phone 300. The subject matter of the content headlines may be selected from one or more categories of content, as discussed above, for example weather information 312, sports scores 314, or news items 316, among others. The preceding embodiments describing the format used to display content are merely examples. Any combination of these or other methods of formatting the content for display are contemplated as within the scope of the present disclosure.

In another embodiment, the display screen 302 may provide a prompt (not shown) prior to call completion, presenting the user with the option of whether content associated with the general geographic location of the called party should be presented. In another embodiment, the system may display the local time 310 at the general geographic location of the called party prior to completing the call, and prompt the user placing the call with the option to complete the call as dialed, or to forward the call to the called party's voice mail service.

Figure 4:
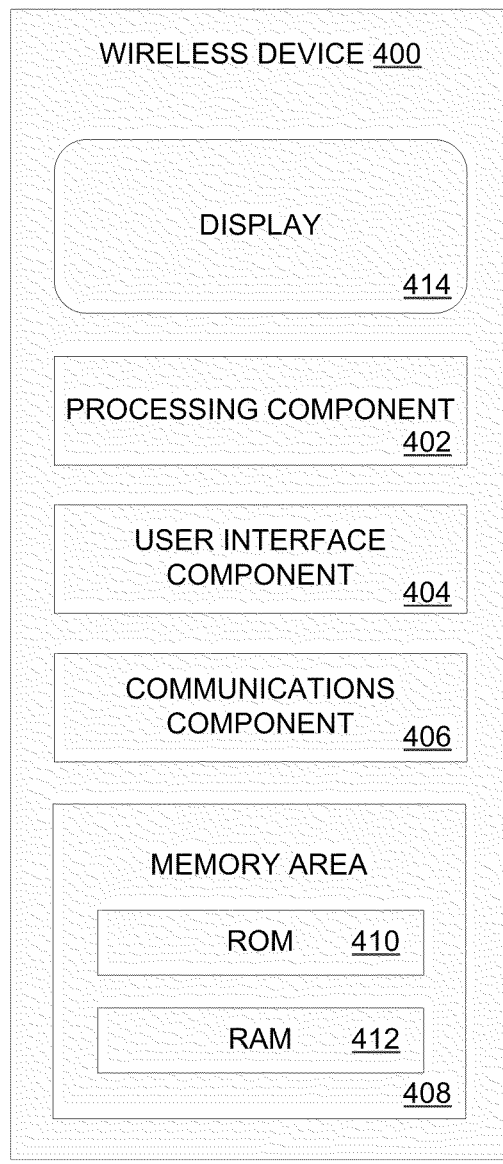
FIG. 4 depicts a block diagram of an example wireless communications device.

FIG. 4 is a block diagram representing the components of an example wireless device 400 used with the system. Wireless device 400 may include a processing component 402, a user interface component 404, a wireless communications component 406, a memory area 408, and/or a display 414.

The processing component 402 may include any hardware and/or software necessary for operating and/or controlling the user interface component 404, the wireless communications component 406, and the memory area 408. For example, the processing component 402 may be individual digital logic components, a processor, a microprocessor, an application-specific integrated circuit (ASIC), and the like. The processing component 402 may have its own memory such as random access memory (RAM), register memory, cache memory, and the like.

The processing component 402 may be in communication with and/or in control of the user interface component 404, the wireless communications component 406, and/or the memory area 408. For example, the processing component 402 may direct the user interface component 404 to receive input from the user or present content on display 414, transmit or receive data via the wireless communications component 406, or retrieve preferences from a user profile stored in the memory area 408.

The processing component 402 may operate on computer-executable instructions. Computer-executable instructions may include computer-readable instructions, for example machine code, byte code, script language, runtime code, and the like. The computer-executable instructions for example, when executed by the processing component 402, may cause the processing component to perform the method described in FIG. 6.

The user interface component 404 may be, in any combination of hardware and/or software, any component, system and/or subsystem for receiving input from a user and/or outputting information to the user. The user interface component 404 may include a display 414, a number pad, or a keyboard. For example, the user interface component 404 may include a telephone keypad, programmable soft keys, mechanical buttons, touch screens, and the like. One or more displays 414 may provide visual output, for example the display of content associated with a general geographic location, as described in FIG. 3. The user interface component 404 may include a speaker for audio output and/or a microphone for audio input.

The wireless communications component 406 may be, in any combination of hardware and/or software, any component, system, and/or subsystem for providing wireless communications to or from the device. The wireless communications component 406 may provide a wireless communications channel 214 between wireless devices. The wireless communications component 406 may provide point-to-point wireless communications between wireless device 400 and a peer device. For example, the wireless communications component 406 may communicate in accordance with the BLUETOOTH® protocol, such as BLUETOOTH® 1.0, BLUETOOTH® 1.0B, BLUETOOTH® 1.1, BLUETOOTH® 1.2, BLUETOOTH® 2.0, BLUETOOTH® 2.0+ Enhanced Data Rate (EDR), BLUETOOTH® 2.1+EDR, Institute of Electrical and Electronics Engineers, Inc. (IEEE) specification 802.15.1, and the like.

Wireless communications component 406 may provide radio frequency (RF) communications between wireless device 400 and other wireless devices, for example cell phones 202 and 204, laptops 206, PDAs 208, and the like. Wireless communications component 406 may provide a wireless communications channel between wireless device 400 and a wireless communications network such as the radio access network (see FIG. 1B). Wireless communications component 406 may provide cellular communications or wireless data network communications, for example Wi-Fi (IEEE 802.11), WiMAX (IEEE 802.16), and the like.

Memory area 408 may be any component, system, and/or subsystem suitable for storing data. For example, memory area 408 may include storage media in the form of volatile and/or nonvolatile memory such as read only memory (ROM) 410 and random access memory (RAM) 412. A basic input/output system (BIOS), containing basic routines that help to transfer information between components within wireless device 400, such as during start-up, is typically stored in ROM 410. RAM 412 typically contains data and/or application modules that are immediately accessible to and/or presently being operated on by the processing component 402.

Wireless device 400 may also include other removable/non-removable, volatile/nonvolatile storage media that can be used as part of memory area 408, for example hard disk drives, optical disc drives, flash memory cards, and the like. The storage media discussed above and illustrated in FIG. 4 provide for storage of computer-readable instructions, data structures, program modules and other data for the wireless device 400, which may be executed on processing component 402.

Figure 5:
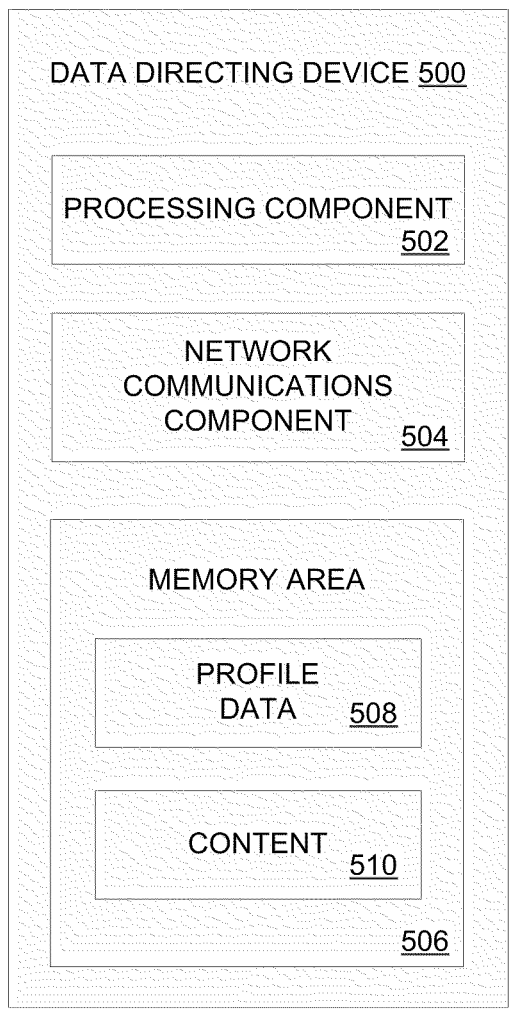
FIG. 5 depicts a block diagram of an example data directing device connected to a communications network.

FIG. 5 is a block diagram representing the components of an example data directing device 500 used by the system. Data directing device 500 may include a processing component 502, a network communications component 504, and a memory area 506.

The processing component 502 may include any hardware and/or software necessary for operating and/or controlling the network communications component 504, and the memory area 506. For example, the processing component 502 may be individual digital logic components, one or more processors, one or more microprocessors, an application-specific integrated circuit (ASIC), and the like. The processing component 502 may have its own memory such as random access memory (RAM), register memory, cache memory, and the like.

The processing component 502 may be in communication with and/or in control of the network communications component 504, and/or the memory area 506. For example, the processing component 502 may transmit or receive data via the wireless communications component 406, or retrieve preferences from a user profile 508 or content 510 associated with a general geographic location stored in the memory area 506.

The processing component 502 may operate on computer-executable instructions. Computer-executable instructions may include computer-readable instructions, for example machine code, byte code, script language, runtime code, and the like. The computer-executable instructions for example, when executed by the processing component 502, may cause the processing component to perform the method described in FIG. 6.

The network communications component 504 may be, in any combination of hardware and/or software, any component, system, and/or subsystem for providing wireless or wire line communications to or from the device. The network communications component 504 may provide a wireless communications channel 214 between wireless devices. The network communications component 504 may provide a wire line communications channel 220 over a hard wired communications link. The network communications component may employ one or more communications, networking, or data transmission protocols, for example TCP/IP, ISDN, ADSL, SONET, IPX/SPX, HTTP, FTP, ATM, Frame Relay, the BLUETOOTH® protocol, Wi-Fi (IEEE 802.11), WiMAX (IEEE 802.16), and the like.

Memory area 506 may be any component, system, and/or subsystem suitable for storing data. For example, memory area 506 may include storage media in the form of volatile and/or nonvolatile memory such as read only memory (ROM) and random access memory (RAM). A basic input/output system (BIOS), containing basic routines that help to transfer information between components within data directing device 500, such as during start-up, is typically stored in ROM. RAM typically contains data and/or application modules that are immediately accessible to and/or presently being operated on by the processing component 502. Memory area 506 may have stored therein user profile 508 data for a wireless device 400 or content 510 associated with one or more general geographic locations.

Data directing device 500 may also include other removable/non-removable, volatile/nonvolatile storage media that can be used as part of memory area 506, for example hard disk drives, optical disc drives, flash memory cards, and the like. The storage media discussed above and illustrated in FIG. 5 provide for storage of computer-readable instructions, data structures, program modules and other data for the data directing device 500, which may be executed on processing component 502.

Figure 6:
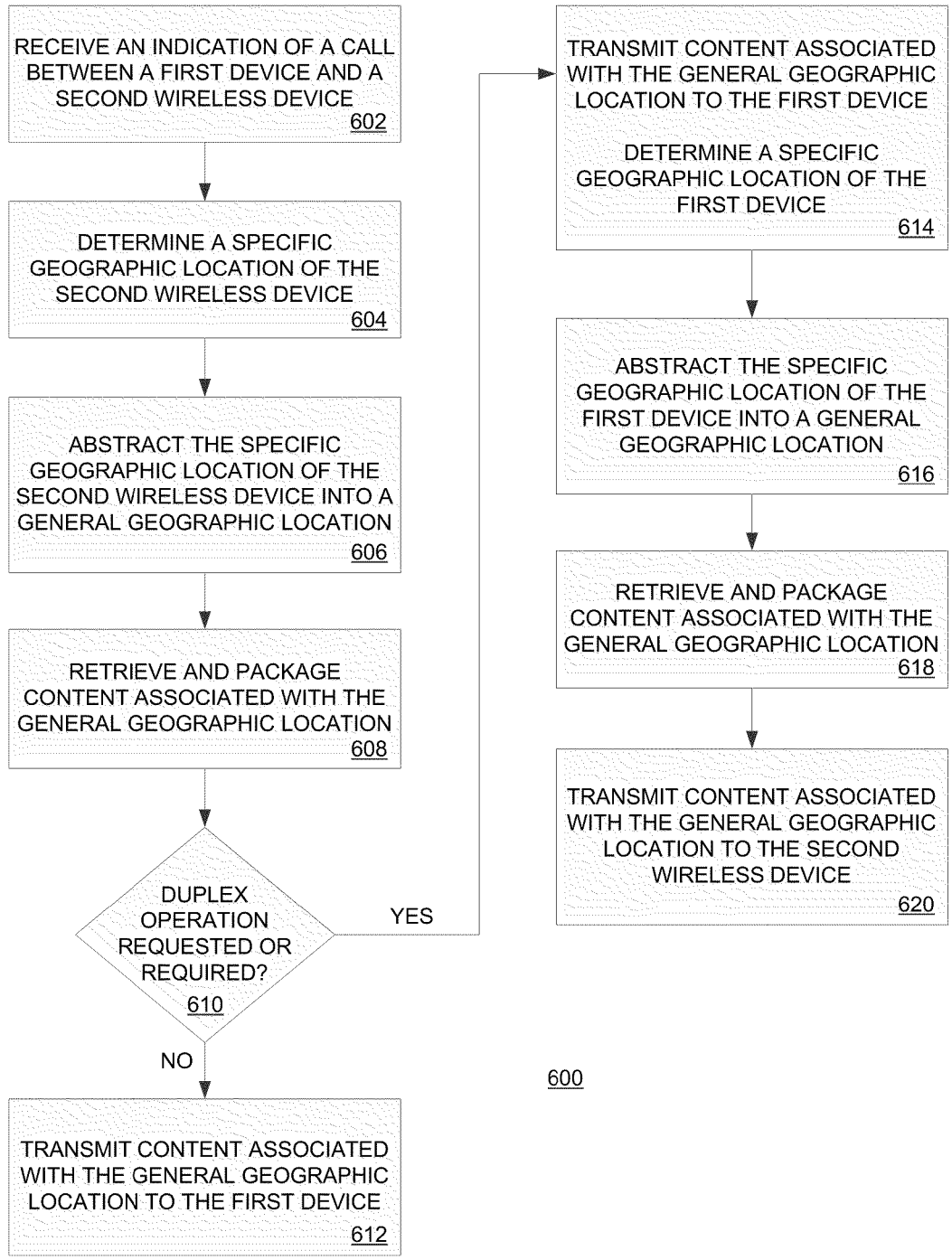
FIG. 6 depicts a flow diagram of an example process for providing call enhancement with localized information.

FIG. 6 depicts a flow diagram of an example process 600 for providing call enhancement with localized information to one or more wireless communications devices. The process may be invoked at the time of call setup or during the course of a call.

At 602, an indication of a call between a first device and a second wireless device may be received. In an embodiment, the first and second devices may be in radio frequency communication with each other via a wireless communications network.

At 604, a specific geographic location of the second wireless device may be determined using one or more location-based services, for example Enhanced Cell Identification (E-CID), Time Difference of Arrival (TDOA), Time of arrival (TOA), Angle of Arrival (AOA), Enhanced Observed Time Difference (E-OTD), Assisted-GPS (A-GPS) and the like.

At 606, the specific geographic location of the second wireless device determined at 604 may be abstracted into a general geographic location of the second wireless device. The degree of abstraction applied may be determined by reference to a configurable privacy setting, for example a privacy setting stored in a user profile.

At 608, content associated with the general geographic location of the second wireless device may be retrieved and packaged for transmission to the first device for presentation on a display of the first device. The content may be retrieved from the data storage area of the device which performed the location abstraction, or may be retrieved by that device from a server device on the same network or from a server device connected to a remote network.

At 610, it may be determined whether duplex operation of the call enhancement with localized information system is requested or required. In an embodiment, the decision regarding whether or not to invoke duplex operation may be determined based on a preference stored in a user profile. In another embodiment, duplex operation may be invoked based on a user request made at the time of call setup or during the course of a call.

At 612, if duplex operation is not invoked, the content associated with the general geographic location of the second wireless device may be transmitted to the first device for presentation on a display of the first device.

At 614, if duplex operation is requested or required, the content associated with the general geographic location of the second wireless device may be transmitted to the first device for presentation on a display of the first device as in 612, and a specific geographic location of the first device may be determined using one or more location-based services, for example Enhanced Cell Identification (E-CID), Time Difference of Arrival (TDOA), Time of arrival (TOA), Angle of Arrival (AOA), Enhanced Observed Time Difference (E-OTD), Assisted-GPS (A-GPS), and the like.

At 616, the specific geographic location of the first device determined at 614 may be abstracted into a general geographic location of the first device. The degree of abstraction applied may be determined by reference to a configurable privacy setting, for example a privacy setting stored in a user profile.

At 618, content associated with the general geographic location of the first device may be retrieved and packaged for transmission to the second wireless device for presentation on a display of the second wireless device. The content may be retrieved from the data storage area on the device which performed the location abstraction, or may be retrieved by that device from a server device on the same network or from a server device connected to a remote network.

At 620, the content associated with the general geographic location of the first device may be transmitted to the second wireless device for presentation on a display of the second wireless device.

While the various embodiments discussed above have been described in connection with the embodiments of the various figures, other similar embodiments may be used or modifications and additions may be made to the described embodiments for performing the same or similar functions. Therefore, the embodiments should not be limited to any of the discussed embodiments, but rather should be construed in breadth and scope in accordance with the appended claims.

What is claimed:

1. A method comprising:
   receiving an indication of a call from a first wireless device to a second wireless device;
   determining a specific geographic location of the second wireless device;
   abstracting the specific geographic location of the second wireless device into a general geographic location of the second wireless device in accordance with a configurable privacy setting associated with the second wireless device;
   obtaining, in accordance with a configurable category setting associated with the first wireless device, information localized to the general geographic location of the second wireless device, wherein the information localized to the general geographic location of the second wireless device comprises at least one of news information, weather information, or sports information; and
   transmitting the information to the first wireless device.

2. The method of claim 1, wherein the call comprises a wireless communication at least in part between the first and second wireless devices.

3. The method of claim 1, wherein the configurable privacy setting is determined by a profile associated with the second wireless device.

4. The method of claim 1, wherein the configurable privacy setting is dynamically determined based on a characteristic of the first wireless device.

5. The method of claim 1, the method further comprising:
   transmitting, to the first wireless device, updated information localized to the general geographic location of the second wireless device.

6. The method of claim 5, wherein a subject of the updated information is selected based on a context of the call.

7. The method of claim 6, wherein the context of the call is determined using speech recognition techniques.

8. The method of claim 1, wherein the information is presented on the first wireless device upon initiation of the call.

9. The method of claim 1, wherein the information is presented on the first wireless device after call setup has been completed and prior to termination of the call.

10. The method of claim 1, further comprising:
    determining a specific geographic location of the first wireless device;
    abstracting the specific geographic location of the first wireless device into a general geographic location of the first wireless device in accordance with a configurable privacy setting; obtaining, in accordance with a configurable category setting associated with the second wireless device, second information localized to the general geographic location of the first wireless device; and transmitting the second information to the second wireless device.

11. A computer-readable storage medium that is not a propagating signal, the computer-readable storage medium having stored thereon computer-readable instructions that when executed by a processor perform a method comprising:

identifying, at a first wireless device, a call between the first wireless device and a second wireless device;

prompting on a display of the first wireless device for an indication to present information localized to a general geographic location of the second wireless device, wherein the information localized to the general geographic location of the second wireless device comprises at least one of news information, weather information, or sports information;

receiving the information at the first wireless device; and presenting the information by the first wireless device in accordance with the indication, wherein the general geographic location of the second wireless device is abstracted from a determined specific geographic location of the second wireless device in accordance with a configurable privacy setting associated with the second wireless device.

12. The computer-readable storage medium of claim 11, wherein the method further comprises:

forwarding the information to an alternate device specified by a user of the first wireless device, upon request of the user of the first wireless device.

13. The computer-readable storage medium of claim 11, wherein the method further comprises:

providing a profile for the first wireless device for recording preferences related to the presentation of information by the first wireless device.

14. The computer-readable storage medium of claim 11, wherein the method further comprises:

prompting on a display of the first wireless device for selections of particular portions of the information to display on the first wireless device.

15. The computer-readable storage medium of claim 11, wherein the method further comprises:

receiving, at the first wireless device, updated information localized to the general geographic location of the second wireless device;

generating a notification by the first wireless device that the updated information is available and prompting for a second indication to present the updated information; and upon receipt of the second indication to present the updated information, displaying the updated information on the display of the first wireless device.

16. A device for directing data, the device comprising:

a communications component configured to receive an indication of a call between respective first and second wireless devices;

a location component in communication with the communications component, wherein the location component is configured to determine a specific geographic location of the second wireless device; and a processor configured to:

abstract the specific geographic location of the second wireless device into a general geographic location of the second wireless device in accordance with a configurable privacy setting associated with the second wireless device;

obtain, in accordance with a configurable category setting associated with the first wireless device, information localized to the general geographic location of the second wireless device, wherein the information localized to the general geographic location of the second wireless device comprises at least one of news information, weather information, or sports information; and transmit to the first wireless device, via the communications component, the information.

17. The device of claim 16, wherein the processor is further configured to:

obtain updated information localized to the general geographic location of the second wireless device; and transmit to the first wireless device, via the communications component, the updated information.

18. The method of claim 17, wherein a subject matter of the updated information is selected based on a context of the call.

19. The method of claim 18, wherein the context of the call is determined using speech recognition techniques.

20. The device of claim 16, wherein the processor is further configured to:

forward the information to an alternate device specified by a user of the first wireless device.

21. The device of claim 16, wherein the processor is further configured to:

upon determination of the specific geographic location of the second wireless device by the location component, and prior to completion of call setup, transmit for presentation on a display of the first wireless device the current local time at the specific geographic location of the second wireless device; and prompt on the display of the first wireless device for an indication to abort completion of the call or to have the call transferred to a voice mail service associated with the second wireless device.

22. The device of claim 16, wherein:

the location component is further configured to determine a specific geographic location of the first wireless device; and the processor is further configured to abstract the specific geographic location of the first wireless device into a general geographic location of the first wireless device in accordance with a configurable privacy setting associated with the first wireless device and to transmit to the second wireless device, via the communications component, information localized to the general geographic location of the first wireless device.

23. The device of claim 16, wherein the configurable privacy setting is determined by a profile stored on the first wireless device.

24. A method comprising:

receiving an indication of a call between a first device and a second device;

determining a specific geographic location of the second device;

abstracting the specific geographic location of the second device into a general geographic location of the second device;

obtaining information localized to the general geographic location of the second device, wherein the information localized to the general geographic location of the second wireless device comprises at least one of news information, weather information, or sports information; and transmitting the information to the first device.

* * * * *